United States Patent
Lee et al.

(10) Patent No.: US 7,526,047 B2
(45) Date of Patent: Apr. 28, 2009

(54) METHOD FOR ENCODING A MESSAGE INTO GEOMETRICALLY UNIFORM SPACE-TIME TRELLIS CODES

(75) Inventors: Jae Hong Lee, Seoul (KR); Young Seok Jung, Masan-si (KR)

(73) Assignee: Seoul National University Industry Foundation (KR)

( * ) Notice: Subject to any disclaimer, the term of this patent is extended or adjusted under 35 U.S.C. 154(b) by 613 days.

(21) Appl. No.: 10/877,025

(22) Filed: Jun. 25, 2004

(65) Prior Publication Data

US 2005/0005229 A1  Jan. 6, 2005

(30) Foreign Application Priority Data

Jun. 27, 2003  (KR) .................. 10-2003-0042669

(51) Int. Cl.
*H04L 27/00* (2006.01)
(52) U.S. Cl. .............. 375/299; 375/296; 375/265; 714/792
(58) Field of Classification Search ......... 375/259–261, 375/265, 267, 295–296, 299, 377; 714/699, 714/746, 786, 792; 704/200, 231, 236, 242
See application file for complete search history.

(56) References Cited

OTHER PUBLICATIONS

G.D. Forney et al. "The dynamics of group codes: state spaces, trellis diagrams and canonical encoders," IEEE Trans. Inform. Theory, vol. 39, pp. 1491-1513, 1993.*
V. Tarokh et al. "Space-time codes for high data rate wireless communication: Performance criterion and code construction," IEEE Trans. Inform. Theory, vol. 47, pp. 744-765, Mar. 1998.*
Forney, David. "The Dynamics of Group Codes: State Spaces, Trellis Diagrams, and Canonical Encoders." IEEE Transactions on information theory, vol. 39(9). pp. 1491-1513: Sep. 1993.*
Baro, Stephan, "Improved Codes for Space-Time Trellis-Coded Modulation." IEEE communications letters, vol. 4(1), pp. 20-22: Jan. 2000.*
V. Tarokh et al., "Space-time codes for high data rate wireless communication: Performance criterion and code construction," IEEE Trans. Inform. Theory, vol. 47, pp. 744-765, Mar. 1998.
S. Baro et al., "Improved codes for space-time trelllis-coded modulation," IEEE Commun. Lett., vol. 4, pp. 20-22, Jan. 2000.
Q. Yan et al., "Improved space-time convolutional codes for quasi-static slow fading channels," IEEE Trans. Wireless Commun., vol. 1; pp. 563-571, Oct. 2002.
W. Firmanto et al., Space-time TCM with improved performance on fast fading channels., IEEE Commun. Lett., vol. 5, pp. 154-156, Apr. 2001.
Y.S. Jung et al., "New measure of coding gain for space-time trellis codes," in Proc. ISIT 2001, Washington, DC, USA, p. 198, Jun. 2001.
Young Seok Jung et al., Geometrically Uniform Space-Time Codes; ISIT 2003; Japan; Jun. 29-Jul. 4, 2003; 1 page.
G. David Forney, Jr.; Geometrically Uniform Codes; IEEE Transactions of Information Theory, vol. 37, No. 5; Sep. 1991; pp. 1241-1260.

* cited by examiner

*Primary Examiner*—Shuwang Liu
*Assistant Examiner*—James M Perez
(74) *Attorney, Agent, or Firm*—Keusey, Tutunjian & Bitetto, P.C.

(57) ABSTRACT

A method for coding messages by group codes over label alphabet and H-symmetric labeling is provided in order to encode geometrically uniform space-time trellis codes considering a distance spectrum. The coding method makes the complexity of code searching reduced considerably by limiting the object of the code design to geometrically uniform space-time trellis codes (STTCs). Therefore, it is possible to design the STTCs with many states, and also design the STTCs with superior performance.

7 Claims, 4 Drawing Sheets

METHOD FOR ENCODING A MESSAGE INTO GEOMETRICALLY UNIFORM SPACE-TIME TRELLIS CODES

BACKGROUND OF THE INVENTION

1. Field of the Invention

The present invention relates to a coding method that encodes messages to be transmitted through a plurality of the transmit antennas in the communication system wherein signals are transmitted between a plurality of transmit antennas and a plurality of receive antennas. More specifically, the present invention relates to a coding method for encoding a message with group codes over label alphabet and H-symmetric labeling to encode geometrically uniform space-time trellis codes considering distance spectrum.

2. Description of the Related Art

Tarokh, et al., introduced space-time codes that were suitable for multi-input and multi-output antenna systems [V. Tarokh, N. Seshadri, and A. R. Calderbank, "Space-time codes for high data rates wireless communication: Performance criterion and code construction", IEEE Trans. Inform. Theory, vol. 47, pp. 744-765, March 1998]. Then, there has been much research about designs and searches for good space-time codes. Most of the space-time trellis codes (STTCS) are represented by modulator mapping functions and their codes over label alphabet, i.e., label code.

However, the label codes over label alphabet of the trellis codes according to prior arts are not group codes. As a result, space-time codes in the prior art do not have geometrical uniformity, which increases the complexity of code searching.

Meanwhile, Firmanto, et al. designed a space-time trellis code with good performances for fast fading channels by using the design criteria which minimize the maximum pairwise error probability (PEP) [W. Firmanto, B. S. Vucetic, and J. Yuan, "Space-time TCM with improved performance on fast fading channels", IEEE Commun. Lett., vol. 5, pp. 154-156, April 2001]. However, as mentioned above, the design criteria which only minimize the maximum pair-wise error probability can not optimize the performance of the space-time trellis code and can not predict the performance precisely, either.

SUMMARY OF THE INVENTION

The inventors of the present invention have researched a message coding method which can decrease the complexity of code searching in a multi-input and multi-output communication system. As a result, they have found that geometrically uniform space-time trellis codes (GU STTCs) for a fast fading channel can be constructed by group code over label alphabet and H-symmetric labeling, and that by searching for GU STTCs, the complexity of code search can be extensively reduced.

Thus, it is possible to design the STTCs with many states by easily searching a generator matrix G, which has been impossible previously. Further, according to the criteria considering the distance spectrum, the optimal STTCs with superior performance may be designed as well.

Therefore, the object of the present invention is to provide a coding method for coding a message to be transmitted through a plurality of the transmit antennas into geometrically uniform space-time trellis codes (STTCs) in a multi-input multi-output (MIMO) communication system.

The present invention relates to a method for encoding a message which is to be transmitted through multiple transmit antennas in the communication system wherein signals are transmitted between a plurality of transmit antennas and a plurality of receive antennas. More specifically, the present invention relates to a method for encoding a message with group codes over label alphabet and H-symmetric labeling.

The coding method of the present invention has been analyzed by modeling where there are fast fading channels between the MIMO antennas.

According to the present invention, messages are encoded into space-time trellis codes (STTCs) by group codes over label alphabet and H-symmetric labeling, and the encoded STTCs become geometrically uniform.

In order to code messages into geometrically uniform space-time trellis codes according to the present invention, it is preferable to generate label code by matrix multiplying binary sequences of the messages by generator matrix G, at first. Then, the generated label codes are mapped over H-symmetric labeling to code the messages into codeword c which is a space-time trellis code.

More specifically, the binary sequence $\bar{u}_t$ of the message at time t is coded by the space-time trellis code $\bar{c}_t$ according to equation 1., $$\bar{c}_t = M(\bar{u}_t \otimes_{\bar{A}} G^T) \qquad \text{[Equation 1]}$$

wherein $\bar{u}_t$ denotes the binary sequence in the alphabet A to be modulated and transmitted through the transmit antenna, G denotes a generator matrix, the operation $\otimes_{\bar{A}}$ denotes a matrix multiplication defined by multiplying and adding operation of $\bar{A}$, $\bar{A}$ denotes the field whose algebraic structure under addition is isomorphic to label alphabet A, and M denotes an H-symmetric labeling mapping function.

In the present invention, it is preferable that the generator matrix is selected to maximize the minimum symbol hamming distance $\delta_{min}$ between codeword of random messages and all-zero codeword, and also maximize the effective product distance at a predetermined number (such as $\delta_{min}$ or $\delta_{min}+1$) symbol hamming distances.

More specifically, the generator matrix G is selected to minimize the value of equation 2.

$$P_f(e)_N = \sum_{\delta=\delta_{min}}^{\delta_{min}+N-1} \left( \left( \sum_{\Delta \in D_\delta} w_\Delta^\delta \cdot \Delta^{-n} \right)^{-1/(n\cdot\delta)} \cdot \frac{E_s}{4N_0} \right)^{-n\cdot\delta} \qquad \text{[Equation 2]}$$

where $P_f(e)_N$ denotes the n-th order approximation equation of frame error rate (FER), $w_\Delta^\delta$ denotes the number of codewords that have the symbol Hamming distance $\delta$ and the pair-wise product distance $\Delta$ from the all-zero codeword, $\delta_{min}$ denotes the minimum symbol Hamming distance, $D_\delta$ denotes the set of the pair-wise product distances of the codewords from the all-zero codeword, the codeword having symbol Hamming distance $\delta$ and diverging from the all-zero codeword only once in trellis diagram, $N_0/2$ denotes the variance per dimension of AWGN (Additive White Gaussian Noise), $E_s$ denotes the energy per symbol, and n denotes the number of receive antennas.

Hereinafter, the codewords diverging from all-zero codeword only once in trellis diagram are referred to as "codewords simply related to the all-zero codeword". Therefore, $D_\delta$ is the set of the pair-wise product distance of the codeword, which has symbol Hamming distance δ from the all-zero codeword, among the codewords simply related to the all-zero codeword.

BRIEF DESCRIPTION OF DRAWINGS

The above and other objects, features and advantages of the present invention will be more apparent from the following detailed description taken in conjunction with the accompanying drawings.

DETAILED DESCRIPTION OF THE PREFERRED EMBODIMENTS

Hereinafter, detailed embodiments will be explained for the coding method of the present invention with reference to the accompanying drawings. However, the invention is not limited by the detailed embodiments below.

In one embodiment, we take into account multiple transceive antenna system with m transmit antennas and n receive antennas. Further, we assume that we do not know channel state information (CSI) at the transmitter and we know the channel state information at the receiver.

At time t, it is assumed that there are established m·n channels between antenna pairs, wherein m·n channels are independent flat Rayleigh fading. The fast fading channels mean that channel gain varies independently as every symbol.

Figure 1A:
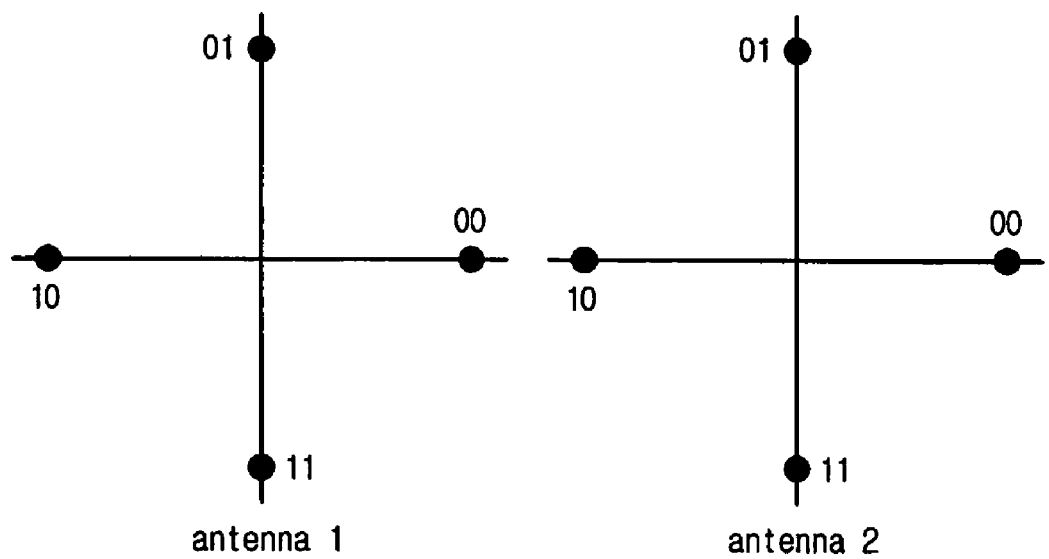
FIG. 1A depicts an example of H-symmetric labeling for 4-PSK modulation with two transmit antennas.

FIG. 1A shows an example of H-symmetric labeling for 4-PSK modulation with two transmit antennas according to the present invention.

Labeling means a function mapping an element over alphabet A to be modulated to a corresponding point in the constellation.

Figure 1B:
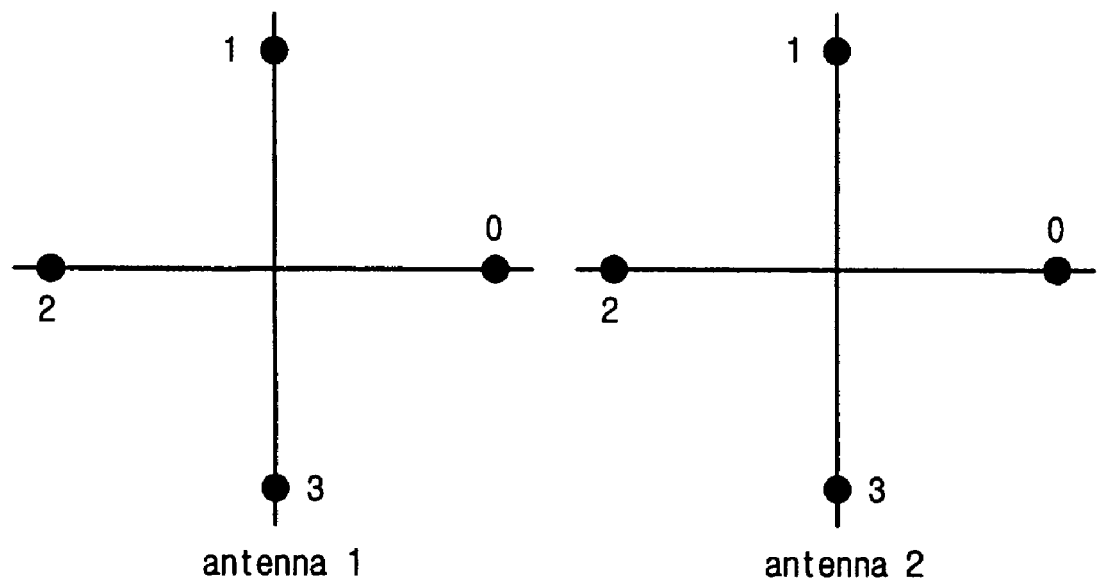
FIG. 1B depicts a conventional H-symmetric labeling.

For example, in case of using QPSK (4-PSK) constellation, space-time codes of prior arts usually use the labeling depicted in FIG. 1B. Though the labeling of FIG. 1B is also an H-symmetry labeling, the labeling codes of space-time codes in prior arts are not group codes on the alphabet A, which is to be modulated and which is isomorphic with $Z_4$.

As such, space-time codes of prior arts do not have geometrical uniformity since the labeling codes of space-time codes in the prior art are not group codes on the alphabet A to be modulated.

In the present invention, however, as H-symmetry labeling as depicted in FIG. 1A is used, it is easy to design group codes over alphabet. The alphabet related to H-symmetry labeling in FIG. 1A is isomorphic to V×V, wherein V is Klein 4-group, and operation × denotes the direct product of groups. In order to perform a systematic code search, we use the generator matrix in order to represent group codes over label alphabet.

Assume that a binary sequence of length κ·l denoted by $\bar{u}=(u_1, \ldots, u_{\kappa \cdot l})$ is transmitted from m antennas, wherein κ=$\log_2$ M, and l is the frame length. Let G be the m×(κ+s) generator matrix for group codes over label alphabet, wherein s represents the number of memory elements in the encoder, each entry being in label alphabet. $2^s$ means the number of states, and each element of matrix G is one of the elements in the alphabet. Let M be an H-symmetric labeling mapping the coded symbols over label alphabet to the 4-PSK signal set. We then obtain the code sequence $\bar{c}=(c_1^1 c_1^2 \ldots c_1^m \ldots c_l^1 c_l^2 \ldots c_l^m)=(\bar{c}_1, \ldots, \bar{c}_l)$ over 4-PSK by applying the H-symmetric labeling to the following matrix multiplication equation 1:

$$\bar{c}_t = M(\bar{u}_t \otimes_{\bar{A}} G^T) \qquad \text{[Equation 1]}$$

wherein $\bar{u}_t$, denotes the input sequence $\bar{u}_t=(u_{\kappa t+(\kappa-1)} \ldots u_{\kappa t+1} u_{\kappa t} \ldots u_{\kappa t-s})$ influencing the space-time symbol $\bar{c}_t$ at time t, $\otimes_{\bar{A}}$ is matrix multiplication using addition and multiplication of $\bar{A}$, $\bar{A}$ denotes the field whose algebraic structure under addition is isomorphic to label alphabet A. Then, $\bar{A}$ is isomorphic with $GF(2^2) \times GF(2^2)$, where $GF(2^2)$ is the Galois field of order $2^2$. Since $\bar{u}$ is assumed to be binary sequence, it is natural that the label code for any generator matrix G over A is a group.

Hereainfter we will explain how to select the generator matrix G.

Assuming that a codeword $\bar{c}$ was transmitted, the probability that a maximum-likelihood (ML) decoder with perfect CSI prefer another codeword $\bar{e}$ to $\bar{c}$, that is, PEP can be expressed as equation 3.

[Equation 3]

$$P(\bar{c} \to \bar{e}) \leq \prod_{t \in \nu(\bar{c},\bar{e})} \|\bar{c}_t - \bar{e}_t\|^{-2n} \cdot \left(\frac{E_s}{4N_0}\right)^{-n \cdot \delta_H(\bar{c},\bar{e})}$$

wherein $\nu(\bar{c},\bar{e})$ denotes the set of time instances t∈{1, 2, . . . , l} such that the Euclidean distance between two space-time symbols $\|\bar{c}_t - \bar{e}_t\|$ is nonzero, symbol Hamming distance $\delta_H(\bar{c},\bar{e})$ is the cardinality of $\nu(\bar{c},\bar{e})$, $E_s$ is the energy per symbol, $N_0/2$ is the variance per dimension of AWGN, and n is the number of receive antennas.

The previously proposed design criteria for STTCs focused on minimizing the maximum PEP.

That is, the minimum symbol Hamming distance $$\delta_{H,\min} = \min_{\bar{e}} |\nu(\bar{c}, \bar{e})|$$

is maximized, and then the minimum product distance $$\Delta_{\min} = \min_{\bar{e}} \prod_{t \in \nu(\bar{c},\bar{e}), |\nu(\bar{c},\bar{e})|=\delta_{H,\min}} \|\bar{c}_t - \bar{e}_t\|^2$$

is maximized.

However, it is known that the spectrum of the product distance comparably affects the frame error rate (FER). Thus, we select generator matrix G considering the distance spectrum.

Let $D_{\bar{c}}$ be the set of codewords that diverge from the codeword $\bar{c}$ only once and merge into the codeword $\bar{c}$ in a trellis diagram. The codeword pair $(\bar{c},\bar{e})$ is called simple if $\bar{e} \in D_c$. Then, FER $P_f(e)$ can be expressed as equation 4.

$$P_f(e) \leq \sum_{\bar{c} \in C} \sum_{\bar{e} \in D_{\bar{c}}} P(\bar{c} \to \bar{e}) \cdot P(\bar{c}) \quad \text{[Equation 4]}$$

wherein C denotes the set of codewords,
$P(\bar{c} \to \bar{e})$ is PEP, and
$P(\bar{c})$ is probability that codeword $\bar{c}$ is transmitted. $P(\bar{c})$ may be 1/|c|, wherein |c| is the number of codewords, since it is generally assumed that the information occurs with equal probability.

The conditional FER of geometrically uniform STTC is independent to the transmitted codeword. Thus, we assume that all-zero codeword $\bar{0}$ was transmitted. Then, we can obtain following equation 5 from equations 3 and 4:

$$P_f(e) \leq \sum_{\bar{e} \in D_{\bar{0}}} P(\bar{0} \to \bar{e}) \leq \sum_{\bar{e} \in D_{\bar{0}}} \Delta(\bar{0}, \bar{e})^{-n} \cdot \left(\frac{E_s}{4N_0}\right)^{-n \delta_H(\bar{0},\bar{e})} \quad \text{[Equation 5]}$$

wherein $$\Delta(\bar{0}, \bar{e}) = \prod_{t \in v(\bar{0},\bar{e})} \|\bar{0}_t - \bar{e}_t\|^2$$

is the pair-wise product distance.

The performance of codes may be estimated from the upper limit of FER of Equation 5. If the codes are not geometrically uniform, the pair-wise product distance between each of all the codewords and the residual codewords should be considered. Thus, if the number of codewords is K, the complexity required to estimate the performance of codewords generated from a generator matrix is K(K−1).

However, according to the present invention, codes are geometrically uniform. Therefore, we have only to calculate the pair-wise product distances between the all-zero codeword and the residual codewords. Thus, the complexity needed to estimate the performance of codewords generated from a generator matrix is remarkably reduced to K due to the geometrical uniformity Let $D_\delta$ denote the set of the pair-wise product distances of codewords from all-zero codeword $\bar{0}$ wherein the codewords have symbol Hamming distance $\delta$ among the codewords simply related to the all-zero codeword. Let L denote the set of the symbol Hamming distances of codewords from the all-zero codeword $\bar{0}$, wherein the codewords are simply related to the all-zero codeword. Then equation 5 can be rearranged as equation 2a:

$$P_f(e) \leq \sum_{\delta \in L} \left(\left(\sum_{\Delta \in D_\delta} w_\Delta^\delta \cdot \Delta^{-n}\right)^{-1/(n \cdot \delta)} \cdot \frac{E_s}{4N_0}\right)^{-n \cdot \delta} \quad \text{[Equation 2a]}$$

wherein $w_\Delta^\delta$ is the number of codewords that have the symbol Hamming distance $\delta$ and the pair-wise product distance $\Delta$ from the all-zero codeword, and that are simply related to the all-zero codeword. Herein, we refer the term $w_\Delta^\delta$ as distance spectrum.

Let $$\left(\sum_{\Delta \in D_\delta} w_\Delta^\delta \cdot \Delta^{-n}\right)^{-1/(n \cdot \delta)}$$

be the effective product distance $\bar{\Delta}_{\delta,n}$ with n receive antennas at the symbol Hamming distance $\delta$. Examining the equation 2a leads to the following design criteria:

1) Diversity Criterion: In order to achieve the largest diversity gain, the minimum Hamming distance should be maximized; and
2) Distance Criterion: In order to achieve the largest coding gain, the effective product distances at first minimum N symbol Hamming distances should be serially maximized.

The N denotes the number of the effective product distances. For example, at the minimum Hamming distance $\delta_{min}$, the effective product distances with the first N symbol Hamming distances is $$\Delta_{\delta_{min}}, \Delta_{\delta_{min}}+1, \ldots, \Delta_{\delta_{min}}+N-1.$$

Therefore, the approximate value of FER can be easily calculated based on the above criteria.

In the present invention, the design criteria that minimize FER will be used. Thus, in order to minimize the value of the equation (i.e., the upper limit of FER), the minimum symbol Hamming distance should be maximized. Further, after the effective product distances is defined considering the distribution of product distances between symbol pairs at random symbol Hamming distances, the generator matrix G that maximizes the effective product distances at each symbol Hamming distances can be easily selected.

Since the maximum PEP used in previous design criteria did not reflect sufficiently FER, the design criteria according to the present invention to select the generator matrix G are superior.

Figure 2:
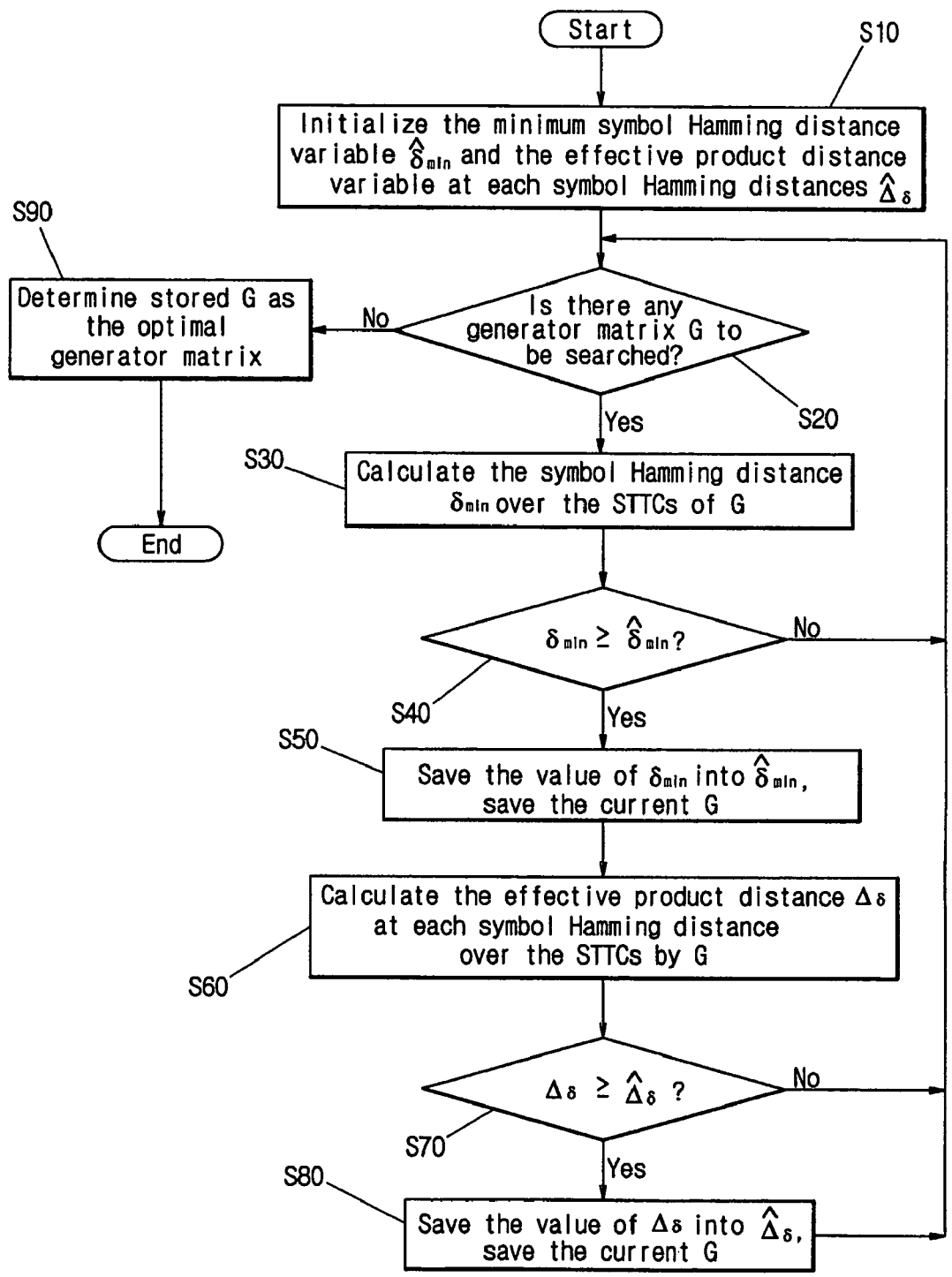
FIG. 2 is a flow chart depicting a determining process for generator matrix G in an encoding procedure according to the present invention.

FIG. 2 is a flow chart that depicts the selecting process of generator matrix G.

At first, initialize the minimum symbol Hamming distance variable $\hat{\delta}_{min}$ and the effective product distance variable at each symbol Hamming distances $\hat{\Delta}_\delta$ to be zero (S10).

In order to select the generator matrix G that is suitable to the design criteria, perform a symbol searching over all the generator matrix G (S20).

Calculate the symbol Hamming distance $\delta_{min}$ over the STTCs based on a generator matrix that are randomly selected (S30).

Compare $\delta_{min}$ with the saved value of $\hat{\delta}_{min}$ (S40).

If $\delta_{min}$ is smaller than the saved value of $\hat{\delta}_{min}$, perform symbol searching again for another generator matrix (S20).

However, if $\delta_{min}$ is larger than the saved value of $\hat{\delta}_{min}$, save the value of $\delta_{min}$ into $\hat{\delta}_{min}$ (S50). Therefore, we can select the generator matrix G which maximizes the value of the symbol Hamming distance $\delta_{min}$. At the same time, the current generator matrix is saved, and the $\hat{\Delta}_\delta$ is initialized. If the $\delta_{min}$ is same with the saved value of $\hat{\delta}_{min}$, it does not matter whether the value of $\delta_{min}$ and the current generator matrix is saved or not.

Then, calculate the effective product distance $\Delta_\delta$ at each symbol Hamming distance over the STTCs based on the generator matrix G(S60). Compare $\Delta_\delta$ with the value of the saved $\hat{\Delta}_\delta$(S70).

If $\Delta_\delta$ is smaller than the saved value of $\hat{\Delta}_\delta$, select another generator matrix G, and perform symbol searching again (S20).

However, if $\Delta_\delta$ is larger than the saved value of $\hat{\Delta}_\delta$, save the value of $\Delta_\delta$ at $\hat{\Delta}_\delta$ (S80). At the same time, the current generator matrix is saved. Therefore, we can select the generator matrix G which maximizes the value of the effective product distances $\Delta_\delta$ at each symbol Hamming distance.

Then, reiterate symbol searching over other generator matrix G until symbol searching over all the generator matrix G is completed (S20). Then, determine the currently stored generator matrix G as the optimal generator matrix (S90).

As explained above, in the present invention, we can code messages into geometrically uniform STTCs, and we can also easily select the optimal generator matrix G through the process depicted in FIG. 2. Table I lists some of the search results.

Herein, TSC STTCs means STTCs of Tarokh, et al.; BBH STTCs means STTCs of Bäro, et al. [S. Bäro, G. Bauch, and A. Hansmann, "Improved codes for space-time trellis-coded modulation," *IEEE Commun. Lett.*, vol. 4, pp. 20-22, January 2000]; YB STTCs means STTCs of Yan, et al. [Q. Yan and R. S. Blum, "Improved space-time convolutional codes for quasi-static slow fading channels," *IEEE Trans. Wireless Commun.*, vol. 1, pp. 563-571, October 2002]; and FVY STTCs menas STTCs of Firmanto et al.

In both figures, it is observed that codes according to the present invention offer a better performance than other known codes. Furthermore, it is worthwhile to mention that 4-PSK 64 and 128-state STTCs according to the present invention have a steeper slope than 4-PSK 32 states STTCs of the prior art. This occurs because the 64-state and 128-state STTCs have $\delta_{min}=4$, while the 32-state STTCs have $\delta_{min}=3$.

TABLE I

4-PSK GU STTC, 2 bit/s/Hz, frame length 130 symbols.

| | Generator matrix G | $\delta_{H,min}$ | $\Delta_{min}$ | $\overline{\Delta}^1_{\delta_{min}}$ | $\overline{\Delta}^1_{\delta_{min}+1}$ |
|---|---|---|---|---|---|
| s = 3 | $\begin{pmatrix} 00 & 10 & 00 & 01 & 11 \\ 10 & 10 & 01 & 10 & 10 \end{pmatrix}$ | 2 | 48 | 0.3750 | 0.1163 |
| s = 4 | $\begin{pmatrix} 00 & 10 & 01 & 10 & 10 & 10 \\ 10 & 11 & 10 & 00 & 11 & 01 \end{pmatrix}$ | 3 | 144 | 0.3780 | 0.1780 |
| s = 5 | $\begin{pmatrix} 00 & 10 & 10 & 01 & 00 & 10 & 01 \\ 10 & 10 & 11 & 10 & 11 & 10 & 11 \end{pmatrix}$ | 3 | 384 | 3.0236 | 0.3325 |
| s = 6 | $\begin{pmatrix} 00 & 10 & 01 & 10 & 10 & 00 & 01 & 11 \\ 10 & 01 & 10 & 00 & 01 & 10 & 10 & 10 \end{pmatrix}$ | 4 | 576 | 1.9592 | 0.5800 |
| s = 7† | $\begin{pmatrix} 00 & 10 & 01 & 01 & 00 & 10 & 00 & 10 & 01 \\ 10 & 10 & 01 & 10 & 10 & 01 & 01 & 10 & 01 \end{pmatrix}$ | 4 | 2304 | 18.286 | 1.1180 |

New GU STTCs generated according to the present invention maximize the minimum Hamming distance and the effective product distances at first minimum 2 symbol Hamming distances. The symbol † indicates that the search for that memory order was not exhaustive.

Firmanto et al. cannot perform the exhaustive code search for 32 states, whereas we can perform the exhaustive code search for 64-states due to the geometrical uniformity and complexity reduction. Furthermore, it is worthwhile to note that some STTCs with the larger minimum product distance can be constructed by using a new modulator mapping function, i.e., H-symmetric labeling.

From Firmonto's paper, it is known that if the conventional modulator mapping function of Tarokh is used, the largest achievable minimum product distances of the STTCs with 16 and 32 states are 64 and 144. However, according to the present invention, the largest achievable minimum product distances are increased to 144 and 384, respectively.

Figure 3:
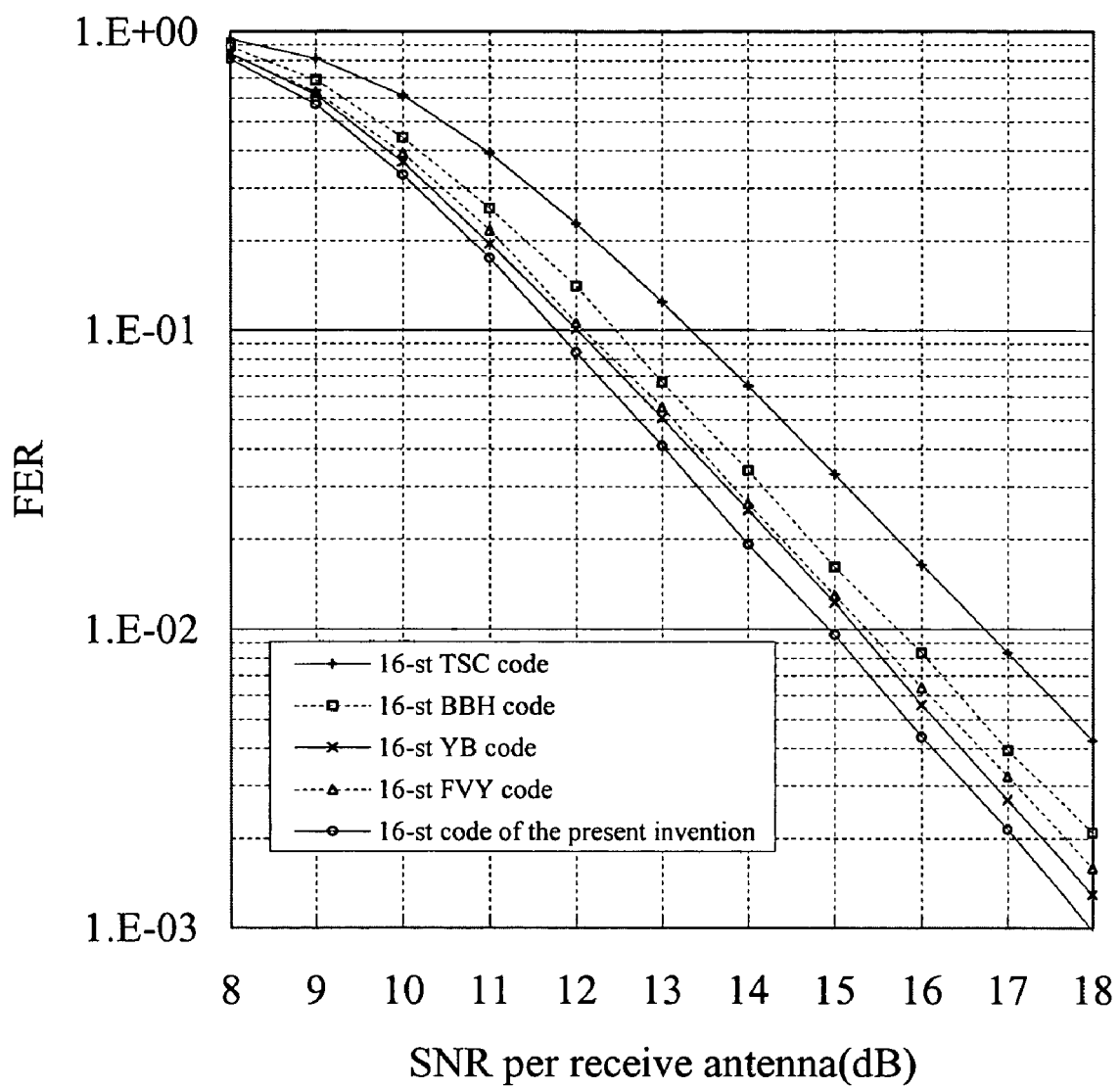
FIG. 3 depicts the frame error rates (FER) performance of geometrical space-time trellis codes for 4-PSK modulation in a fast fading channel according to the present invention.

FIG. 3 shows the FER performance of 4-PSK GU STTC according to the present invention with 16 states and 2 bits/s/Hz in fast fading channels. TSC, BBH, YB, and FVY STTCs with 16 states are presented for comparison.

Figure 4:
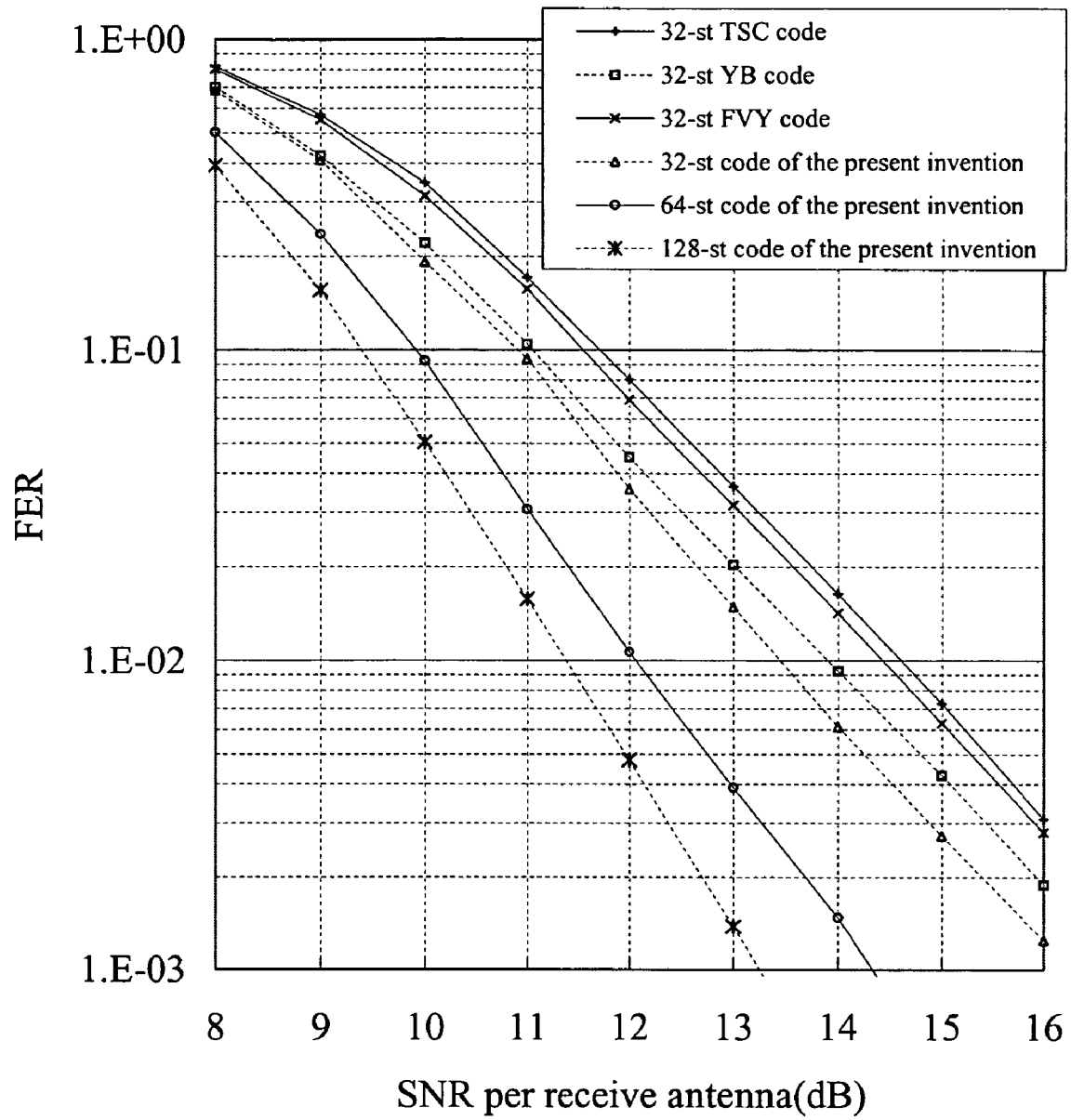
FIG. 4 depicts the FER performance of geometrical space-time trellis codes for 4-PSK modulation with 32, 64, and 128 states in the fast fading channel according to the present invention.

FIG. 4 shows the FER performance of 4-PSK GU STTC according to the present invention with 32, 64, and 128 states and 2 bits/s/Hz in fast fading channels. TSC, YB, and FVY STTCs with 32 states are presented for comparison.

As above mentioned, using the design criteria according to the present invention, it is possible to provide codes having good performance through searching for geometrically uniform space-time codes. Because the object of code searching has geometrical uniformity, the complexity of code searching can be reduced remarkably. In addition, due to this reduction of the complexity, it is possible to search codes which have STTCs with more states, and the optimal generator matrix G can be chosen easily. Therefore the STTCs according to the present invention have better performance than the STTCs in the prior art.

Although preferred embodiments of the present invention has been described for illustrative purposes, those skilled in the art will appreciate that various modifications, additions and substitutions are possible, without departing from the scope and spirit of the invention as disclosed in the accompanying claims.

What is claimed is:

1. A method for coding a message into space-time trellis codes (STTCs) in a multi-input multi-output (MIMO) communication system, comprising the steps of:
   coding a message with an encoder, into space-time trellis codes by group codes over label alphabets and H-symmetric labeling, wherein H-symmetric labeling is a modulation function mapping the group codes over the label alphabets to a corresponding point in a constellation; wherein the step of coding includes producing a label alphabet by matrix-multiplying a binary sequence of the message by generator matrix G; and coding the label alphabet into STTCs $\bar{c}$ by H-symmetry labeling mapping, wherein the binary sequence $\bar{u}_t$ of the message at time t is coded into STTC $\bar{c}_t$ by equation 1:

$$\bar{c}_t = M(\bar{u}_t \otimes_A G^T)$$ [Equation 1]

wherein $\bar{u}_t$ is a binary sequence over label alphabet A that is to be transmitted through m transmit antennas, G is a generator matrix, where G is dependent on the number of memory elements in the encoder, Operation $\otimes_A$ is matrix multiplication defined by addition and multiplication of $\overline{A}$, $\overline{A}$ denotes the field whose algebraic structure under addition is isomomhic to the label alphabet A, and M is an H-symmetric labeling mapping function.

2. The method of claim 1, wherein there exists a fast fading between multiple transmit antennas and multiple receive antennas.

3. The method of claim 2, wherein the coded STTCs have geometrical uniformity.

4. The method of claim 1 further comprising the step of selecting a generator matrix G which maximizes minimum symbol Hamming distance between a codeword over label alphabet and an all-zero codeword, and also maximizes an effective product distance at a predetermined number of symbol Hamming distances.

5. The method of claim 4, wherein the generator matrix G is selected to minimize the value of $P_f(e)_N$ in equation 2:

$$P_f(e)_N = \sum_{\delta=\delta_{min}}^{\delta_{min}+N-1} \left(\left(\sum_{\Delta \in D_\delta} w_\Delta^\delta \cdot \Delta^{-n}\right)^{-1/(n\cdot\delta)} \cdot \frac{E_s}{4N_0}\right)^{-n\cdot\delta}$$ [Equation 2]

wherein $P_f(e)_N$ denotes the n-th order approximation of FER (frame error rate), $W_\Delta^\delta$ denotes the number of codewords that have the symbol Hamming distance $\delta$ and the pair-wise product distance $\Delta$ from all-zero codeword, $\Delta_{min}$ is the minimum symbol Hamming distance, $D_\delta$ denotes the set of the pair-wise product distances of the codewords from the all-zero codeword, the codeword having symbol Hamming distance $\delta$, and diverging from the all-zero codeword only once in trellis diagram, $N_0/2$ is the variance per dimension of AWGN, $E_\delta$ is the energy per symbol, and n is the number of receive antennas.

6. A method for coding a message into space-time trellis codes (STTCs) in a multi-input multi-output communication system, comprising the steps of:

selecting among all the generator matrixes, a generator matrix G which maximizes minimum symbol Hamming distance between a codeword over label alphabet and an all-zero codeword, and also maximizes an effective product distance at a predetermined number of symbol Hamming distances;

producing a label alphabet by matrix-multiplying a binary sequence of the message by the generator matrix G; and coding the label alphabet witn an encoder,into STTCs $\bar{c}$ by H-symmetry labeling which is a modulation function mapping a group code over the label alphabet to a corresponding point in the constellation, wherein the generator matrix G is dependent on the number of memory element in the encoder,and the generator matrix G is selected to minimize the value of $P_f(e)N$ in equation 2:

$$P_f(e)_N = \sum_{\delta=\delta_{min}}^{\delta_{min}+N-1} \left(\left(\sum_{\Delta \in D_\delta} w_\Delta^\delta \cdot \Delta^{-n}\right)^{-1/(n\cdot\delta)} \cdot \frac{E_s}{4N_0}\right)^{-n\cdot\delta}$$ [Equation 2]

$P_{f(e)N}$ denotes the n-th order approximation of ERR (frame error rate), $W_\Delta^\delta$ denotes the number of codewords that have the symbol Hamming distance $\delta$ and the pair-wise product distance $\Delta$ from all-zero codeword, $\delta_{min}$ is the minimum symbol Hamming distance, $D_\delta$ denotes the set of the pair-wise product distances of the codewords from the all-zero codeword, the codeword having symbol Hamming distance $\delta$, and diverging from the all-zero codeword only once in trellis diagram, $N_0/2$ is the variance per dimension of AWGN, $E_\delta$ is the energy per symbol, and n is the number of receive antennas.

7. A method for coding a message into space-time trellis codes (STTCs) in a multi-input multi-output communication system comprising steps of:

selecting generator matrix G which minimizes the value of $P_f(e)_N$ in equation 2; and coding a binary sequence $\bar{u}_t$ of the message at time t with an encoder into STTC $\bar{c}_t$ by equation 1:

$$\bar{c}_t = M(\bar{u}_t \otimes_A G^T)$$ [Equation 1]

$$P_f(e)_N = \sum_{\delta=\delta_{min}}^{\delta_{min}+N-1} \left(\left(\sum_{\Delta \in D_\delta} w_\Delta^\delta \cdot \Delta^{-n}\right)^{-1/(n\cdot\delta)} \cdot \frac{E_s}{4N_o}\right)^{-n\cdot\delta}$$ [Equation 2]

wherein $\bar{u}_t$ is a binary sequence over label alphabet A that is to be transmitted through m transmit antennas, G is a generator matrix,where G is dependent on the number of memory elements in the encoder, Operation $\otimes_A$ is matrix multiplication defined by addition and multiplication of $\overline{A}$, $\overline{A}$ denotes the field whose algebraic structure under addition is isomorphic to the label alphabet A, M is an H-symmetric labeling, which is a modulation function mapping the group code over label alphabets generated by matrix-multiplying the binary sequence by generator matrix into signal sequences over constellation, $P_{f(e)N}$ denotes the n-th order approximation of FER (frame error rate), $W_{\delta\Delta}$ denotes the number of codewords that have the symbol Hamming distance $\delta$ and the pair-wise product distance $\Delta$ from all-zero codeword, $\delta_{min}$ is the minimum symbol Hamming distance, $D_\delta$ denotes the set of the pair-wise product distances of the codewords from the all- zero codeword, the codeword having symbol Hamming distance $\delta$ and diverging from the all-zero codeword only once in trellis diagram, $N_0/2$ is the variance per dimension of AWON, $E_\delta$ the energy per symbol, and n is the number of receive antennas.

* * * * *